Figure 1:
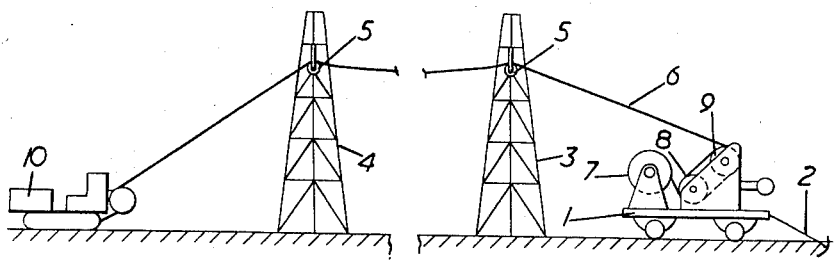

Aug. 2, 1960

H. E. MERRITT 2,947,494

APPARATUS FOR PAYING OUT AND WINDING IN
CABLES, WIRES, ROPES AND THE LIKE

Filed June 26, 1958

3 Sheets-Sheet 1

Inventor
Henry Edward Merritt.

By *A. Knight Broad*
Attorney

Aug. 2, 1960        H. E. MERRITT        2,947,494
    APPARATUS FOR PAYING OUT AND WINDING IN
         CABLES, WIRES, ROPES AND THE LIKE
Filed June 26, 1958                    3 Sheets-Sheet 2
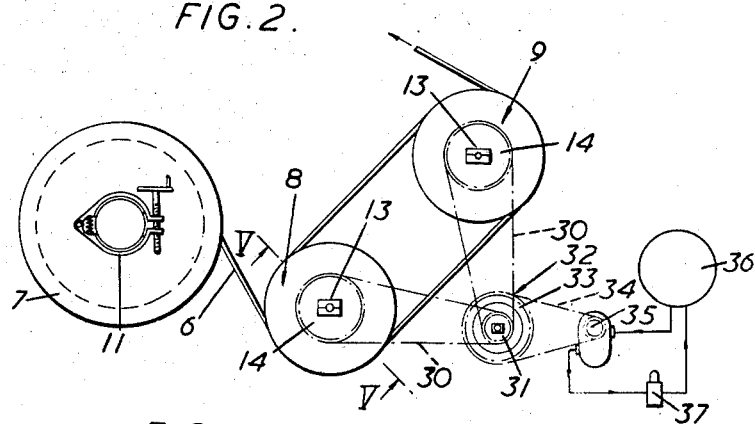
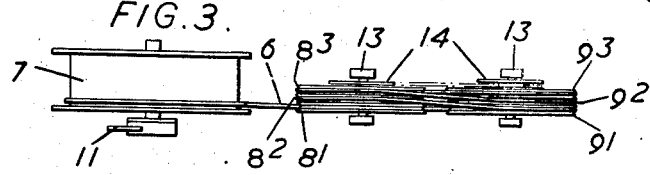
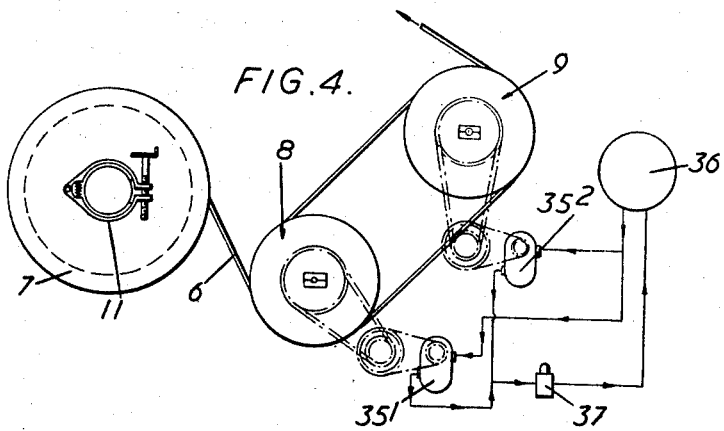
Inventor
Henry Edward Merritt
By
A Knight Croad
Attorney Aug. 2, 1960　　　H. E. MERRITT　　　2,947,494
APPARATUS FOR PAYING OUT AND WINDING IN
CABLES, WIRES, ROPES AND THE LIKE
Filed June 26, 1958　　　　　　　　　3 Sheets-Sheet 3

Inventor
Henry Edward Merritt
By
A. Knight Croad
Attorney

United States Patent Office 2,947,494
Patented Aug. 2, 1960

2,947,494

APPARATUS FOR PAYING OUT AND WINDING IN CABLES, WIRES, ROPES AND THE LIKE

Henry Edward Merritt, Claverdon, England, assignor to Wharton Engineers (Elstree) Limited, Elstree, England Filed June 26, 1958, Ser. No. 744,880

2 Claims. (Cl. 242—156)

This invention relates to apparatus for paying out and/or winding in cables, wires, ropes and the like (reference being made hereinafter for convenience only to "cables"), and it has for its object to provide means whereby the tension in a cable during paying out and/or winding in may be controlled.

Applications of the present invention are numerous but in the following reference will in the main be made to the stringing of overhead electrical conductor cables from pylons or the like.

When stringing overhead electrical conductor cables from pylons the following method has heretofore been adopted. A cable containing drum is mounted near one pylon of a line of previously erected pylons and a traction machine for drawing cable off the drum is located as far away along the line of pylons as the cable on the drum will reach. From the top of each intervening pylon there is suspended a large running pulley and a draw wire or the like is passed from the traction machine over these running pulleys and attached to the free end of the cable on the drum. The traction machine is then driven to pull the cable up over the running pulleys, and once the cable has been drawn up on to and between the pylons it is connected to insulators mounted thereon.

This method is per se simple but it is complicated by several essential factors, among which are the following.

(1) A cable must not be allowed to come into contact with the ground or any objects thereon over which the cable is being strung because it may well be damaged thereby.

(2) When finally strung between two pylons a cable must be at a given required tension to avoid any possibility of damage to the cable or to the pylons due to the cable being too taut, and at the same time to obviate sagging in the cable beyond a prescribed amount.

(3) If a cable is drawn off its containing drum at the tension required for the cable when finally strung, the outer turn of the cable on which pull is exerted will merely compress or work its way into the turns beneath it. In fact the cable drum will almost certainly be crushed, and the cable will become damaged.

In this particular application of the invention therefore the object is to provide means whereby the tension in a cable payed out from its supporting drum may be controlled without being subject to the above mentioned disadvantages. It should be understood, however, that the invention also finds application where a cable is being wound in.

According to this invention there is provided apparatus for use in paying out and/or winding in a cable under tension, which apparatus is in use arranged between a cable supplying or receiving drum or the like and the source of tension exerted on the cable and is adapted to control the tension in the cable between the apparatus and the source of tension, said apparatus comprising a pair of pulley units mounted on spaced approximately parallel main shafts and around which the cable is wrapped in helical fashion, each pulley unit having a plurality of pulley wheels capable of rotation with respect to the shaft thereof and gears carried by and interposed between the pulley wheels for imparting drive one to the other, one of said gears being in mesh with a gear having a driving connection on said shaft and the gears being arranged so that the turning effort for the pulley wheels is divided between them in a desired ratio, the rotation of the driving connection being governed so as to maintain the required tension in the cable.

Figure 5:
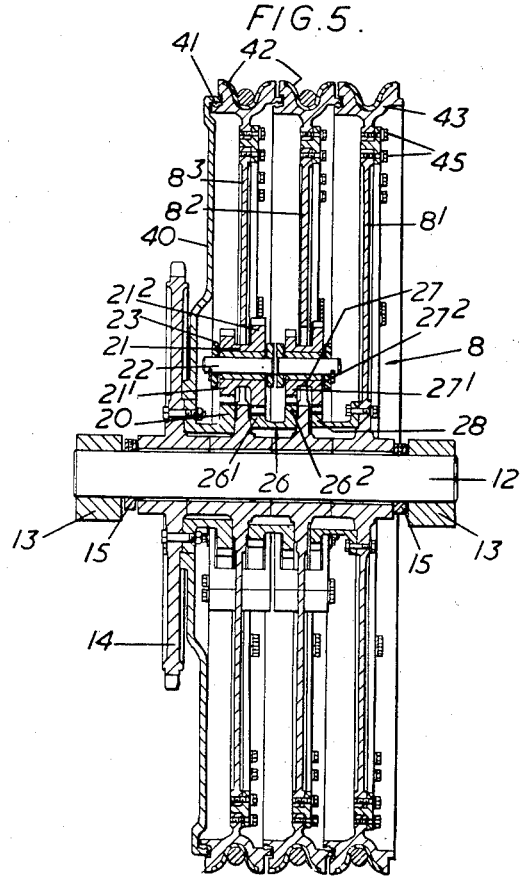
Figure 6:
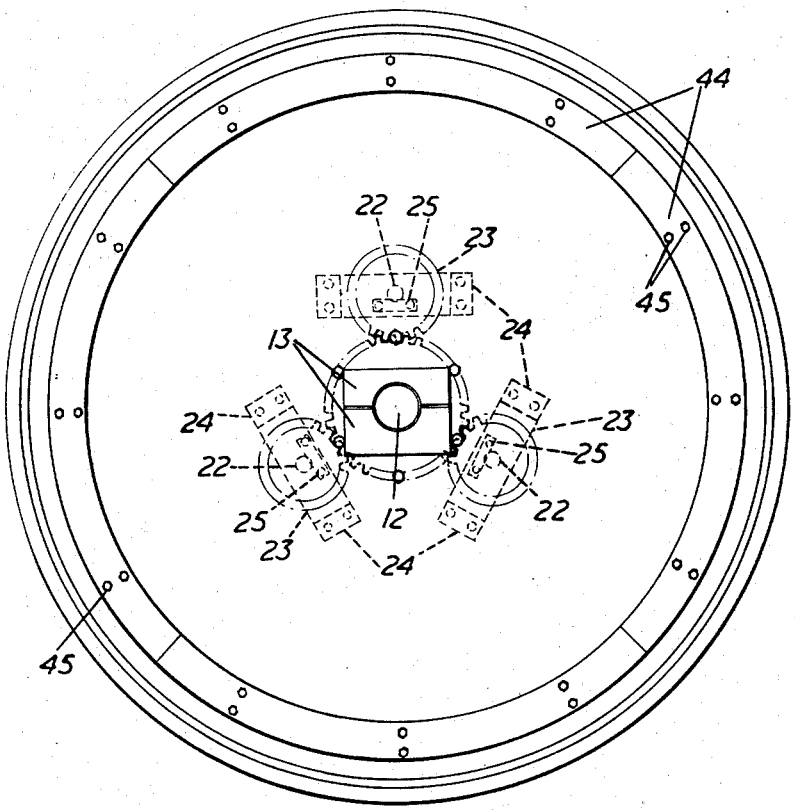

In the accompanying drawings:

Figure 1 illustrates very diagrammatically the stringing of overhead cables from pylons using apparatus in accordance with this invention, Figure 2 illustrates, also diagrammatically and on a larger scale, the parts of the apparatus in accordance with this invention, together with one arrangement of means for restraining the turning of the pulley units thereof, Figure 3 is a plan view of the parts of the apparatus as shown in Figure 2, Figure 4 is similar to Figure 2 but includes an alternative arrangement of means for restraining the turning of the pulley units, Figure 5 is a section through one of the pulley units, drawn on a still larger scale, on the line V—V of Figure 2, and Figure 6 is a side elevation of the pulley unit as shown in Figure 5.

For the stringing of overhead cables from pylons, as is illustrated in Figure 1, apparatus in accordance with this invention is mounted on a wheeled trolley or the like 1 provided with means 2 for anchoring it near a first pylon 3, it being desired to sling a cable between this pylon and a second pylon 4. Suspended from the top of each pylon is a large running pulley 5.

The cable 6 is stored on a drum 7 rotatably mounted on the trolley 1 and on being drawn off the drum it is passed around two pulley units, also mounted on the trolley and indicated generally by the reference numerals 8 and 9, which will be described in detail later. The cable is then drawn up over the pulleys 5 and for this purpose a tractor 10 is normally used, and initially the end of the cable 6 is connected to a draw wire from the tractor as heretofore.

A small initial tension is given to the cable by means of a brake 11 on the drum 7 (see Figures 2 and 4) to prevent the cable slipping on the pulleys of the two pulley units 8 and 9. Then by restraining the turning of the pulley units the required final tension is imparted to the cable leaving the unit 9. How this is achieved will be apparent from the following.

The pulley units 8 and 9 are identical and are each made up of three pulleys, the pulleys $8^1$, $8^2$ and $8^3$ of the unit 8 being shown in Figure 5. These pulleys are mounted on and can rotate with respect to an axle 12 clamped in blocks 13 carried by suitable supports on the trolley 1. Also mounted on the axle 12 so as to be capable of rotation with respect thereto is a chain wheel 14, this wheel and the three pulleys being held close together so that they cannot move laterally by collars 15 fixed on the axle 12.

The chain wheel 14 has coaxially secured to it a gear wheel 20, and this wheel meshes with the outer gear wheels $21^1$ of three gear units 21 mounted on axles 22 fixed in and extending through the web of the pulley $8^3$, the axles 22 being spaced equally from each other and from the axle 12 and secured in plates 23 bolted through spacers 24 to the web of the pulley $8^3$. Rotation of the axles 22 is prevented by members 25 screwed to the plates 23 (see Figure 6). The gear units 21 also include inner gear wheels $21^2$ which mesh with a gear wheel $26^1$ forming part of a gear unit 26 disposed between the pulleys $8^3$ and $8^2$ coaxial with and capable of rotation with respect to the axle 12. The gear unit 26 includes a second gear wheel $26^2$ which meshes with the outer gear wheels $27^1$ of gear units 27 carried by the web of the pulley $8^2$ in like manner to the gear units 21. The gear units 27 also include inner gear wheels $27^2$ which mesh with a gear wheel 28 secured to the pulley $8^1$ coaxially thereof.

The cable 6, on leaving the drum 7 passes in helical fashion around the pulley units 8 and 9, engaging pulleys $8^1$, $9^1$, $8^2$, $9^2$, $8^3$, and $9^3$ in that order (see Figure 3). The turning of the pulleys of the pulley units is restrained to impart the desired tension to the cable.

In the arrangement illustrated in Figure 2 the chain wheels 14 of the two pulley units are connected by chains 30 to chain wheels 31 of a differential gear 32. A central element of this differential gear carries a chain wheel 33 which, through a chain 34, drives the rotor of a hydraulic pump 35. The pump 35 takes fluid from a tank 36 and pumps it through a control valve 37 set to determine the pressure against which the pump is acting, back to the tank. By this means the resistance to turning of the two pulley units may be kept equal and constant and the desired tension imparted to the cable 6 as it is pulled out. The resistance to turning of the two pulley units is not necessarily equal, but may be made in any desired ratio while the sum of the two resistances is kept constant by the pump, by adjusting the gear ratios of the chain wheels 14 and 31, or by adjusting the internal gearing of the differential gear.

In the alternative arrangement shown in Figure 4 the two pulley units 8 and 9 drive separate pumps $35^1$ and $35^2$ respectively, these pumps being piped in parallel to take fluid from the tank 36 and deliver it through a common pipe to the control valve 37 and back to the tank. By this means also the resistance to turning of the two pulley units may be kept equal and constant. The resistance to turning may be made in any desired ratio by adjustment of the gearing between the pulley units and the pumps, or the resistance to turning of each unit may be separately controlled by providing each pump with a separate control valve.

The turning of the pulleys of the pulley units may alternatively be restrained in some other convenient way, for example, by electro magnetic brakes.

Having described the construction of the apparatus thus far, a general explanation regarding the functioning thereof will now be given.

The increment of tension which can be imparted without slip to a cable passing around a cylindrical surface, for example a capstan, depends on the initial tension in the cable where it starts to engage the capstan, the coefficient of friction between the cable and the capstan and the angle of wrap of the cable.

In the present apparatus, if the pulleys of the two units were fixed solidly together so that the units turned as a whole, and each unit were restrained in a manner as described above, increasing increments of tension would be imparted by each succeeding pulley, that by the first pulley being determined by the initial tension in the cable. As the tension in the cable increases, however, so its length is increased and with the pulleys of each unit all turning together at the same speed slip would take place between the cable and the pulleys. The cable would thereby be damaged.

However, the pulleys of the two units are not fixed solidly together, but are in effect connected to the restraining means through a differential mechanism which allows each individual pulley to rotate at a speed appropriate to the cable passing thround it (successive pulleys rotating at increasing speeds because the cable passing around them is lengthening), while at the same time allowing each pulley to contribute its quota of restraint to the cable.

If the pulleys were driven through simple differential gears so that the restraint contributed by each was the same, the contribution of each would be limited to that of the first, which is limited by the initial tension in the cable. Actually it is desirable to keep this initial tension in the cable low because, among other reasons, it is not subject to accurate control, and it is added to the controlled tension imparted by the pulley units.

The gear wheels interconnecting the pulleys of each unit, as described above, are designed so that each pulley can contribute an increasing amount of tension to the cable without slip.

In the last refinement, to keep the number of pulleys at a minimum, by enabling each to contribute the greatest possible increment of tension without slip, the restraint to turning of each succeeding pulley around which the cable passes (i.e. $8^1$, $9^1$, $8^2$, $9^2$, $8^3$, $9^3$) should increase in geometrical ratio. But in order to simplify the gearing and to enable the two pulley units to be identical the restraint on the corresponding pulleys of each unit (e.g. $8^1$ and $9^1$) is made the same, while the restraint on the successive pulleys of the two units $8^1$, $8^2$, $8^3$ and $9^1$, $9^2$, $9^3$ increases approximately geometrically.

By way of illustration only let it be assumed that the number of teeth in each of the gear wheels in the pulley unit, as described above with reference to Figure 5, is as follows:

| Gear wheel: | Number of teeth |
|---|---|
| 20 | 62 |
| $21^1$ | 20 |
| $21^2$ | 39 |
| $26^1$ | 43 |
| $26^2$ | 65 |
| $27^1$ | 17 |
| $27^2$ | 40 |
| 28 | 42 |

As previously stated, the cable 6 comes from the storage drum and passes in succession round pulleys $8^1$, $9^1$, $8^2$, $9^2$, $8^3$, $9^3$ and it is desired that the restraint imposed on the cable by pulleys $8^1$, $8^2$ and $8^3$ shall increase in approximately geometric ratio.

Suppose for a moment that chain wheel 14 and pulleys $8^2$ and $8^3$ are restrained against rotation, and that a turning effort $T_1$ be imparted to the pulley $8^1$. (Actually $T_1$ is caused by the increase in tension in the cable as it goes round pulley $8^1$.)

Then a turning effort will be applied to gear unit 26 through the gear train 28, $27^2$, $27^1$ and $26^2$ equal to $$\left(\frac{39}{43} \times \frac{65}{17}\right) T_1 \doteq 3.46 T_1$$

and there will be an opposing reaction $T_2$ on pulley $8^2$ and $$T_2 = T_1(1 - 3.46) = -2.46 T_1$$

Similarly, the turning effort $3.46 T_1$ in gear unit 26 will apply through the gear train $26^1$, $21^2$, $21^1$ and 20 a turning effort of $$3.46 T_1 \left(\frac{39}{43} \times \frac{62}{20}\right) = 3.46 T_1 \times 2.81 \doteq 9.75 T_1$$

to gear 20 and chain wheel 14, and there will be an opposing reaction $T_3$ on pulley $8^3$ and $$T_3 = T_1(3.46 - 9.75) = -6.29 T_1$$
$$= 2.55 T_2$$

So that $T_1$, $T_2$ and $T_3$ are in approximately geometrical ratio.

In operation, however, the pulleys are not restrained against rotation and an effort equal to the above mentioned restraint is applied to them by the cable which is being pulled out. So that the total applied turning effort is $$T_1 + T_2 + T_3 = 9.75 T_1$$

and is, of course, equal to the turning effort already shown to be applied to chain wheel 14.

It will be understood that the restraint applied by pulleys $8^2$ and $8^3$ is related to that which can be applied to the pulley $8^1$ without risk of slip, given the initial tension in the cable coming on to it. The pulleys $9^1$, $9^2$ and $9^3$ contribute in similar proportions to the total restraint on the cable 6 which is being pulled out.

A cover plate 40 is attached to each chain wheel 14 and engages a groove 41 in the adjacent pulley $8^3$ (see Figure 5), this groove being fitted with sealing means to prevent ingress of dirt, and egress of oil. Similar sealing means are provided between the adjacent pulleys $8^3$, $8^2$ and $8^1$.

The rims of the pulleys are lined with suitable material 42 to prevent damage to a cable and to increase the coefficient of friction with the cable, and so reduce the number of pulleys required. In order that the grooved rims 43 of the pulleys may be changed to suit different kinds of cable without dismantling the rest of the pulley units, and in order that they may be all the same although the pulleys are of different designs, the rims are made easily detachable. Thus the rims 43 are secured to the rest of the pulleys by two or more curved fixing and spacing pieces 44 (see Figure 6) which are secured to both the rims and the pulley centres by screws 45.

I claim:

1. Apparatus for use in paying out and winding in a cable under tension, which apparatus is in use arranged between a drum capable of supplying and receiving cable and the source of tension exerted on the cable and is adapted to control the tension in the cable between the apparatus and the source of tension, said apparatus comprising a pair of pulley units respectively mounted on spaced approximately parallel main shafts and around and between which units the cable is wrapped in helical fashion, each pulley unit having a plurality of pulley wheels capable of rotation with respect to the shaft thereof and also having gear means carried by and operatively interposed between the respective pulley wheels for imparting controlled rotary movement from one to the other, and means for applying a braking force to each pulley unit, the said gear means being adapted to divide said force between the pulley wheels in a desired ratio, to give the required tension in the cable.

2. Apparatus for use in paying out and winding in a cable under tension, which apparatus is in use arranged between a drum capable of supplying and receiving cable and the source of tension exerted on the cable and is adapted to control the tension in the cable between the apparatus and the source of tension, said apparatus comprising a pair of pulley units respectively mounted on spaced approximately parallel main shafts and around and between which units the cable is wrapped in helical fashion; each pulley unit having a plurality of pulley wheels capable of rotation with respect to the shaft thereof and also having gear means carried by and operatively interposed between the respective pulley wheels for imparting controlled rotary movement from one to the other, a member mounted coaxially with the pulley wheels and in driving engagement with the gear means carried by one of the pulley wheels, a hydraulic pump arranged in a closed fluid circuit, means drivingly connecting the rotor of said pump with said member, a valve included in said fluid circuit and set to a pressure against which the pump is to act, whereby a braking force is applied to the pulley unit, the said gear means being adapted to divide said force between the pulley wheels in a desired ratio, to give the required tension in the cable.

References Cited in the file of this patent

FOREIGN PATENTS 474,250    Italy _____ Sept. 13, 1952